United States Patent [19]

Ohyama

[11] Patent Number: 4,866,783
[45] Date of Patent: Sep. 12, 1989

[54] SYSTEM FOR DETECTING EDGE OF IMAGE

[75] Inventor: Toshinobu Ohyama, Ise, Japan

[73] Assignee: Shinko Electric Co., Ltd., Japan

[21] Appl. No.: 258,065

[22] Filed: Oct. 13, 1988

Related U.S. Application Data

[63] Continuation of Ser. No. 933,029, Nov. 20, 1986, abandoned.

[30] Foreign Application Priority Data

Nov. 27, 1985 [JP] Japan .................... 60-266893

[51] Int. Cl.$^4$ .............................. G06K 9/46
[52] U.S. Cl. ........................ 382/23; 382/22
[58] Field of Search ............... 358/148, 176; 382/22, 382/23, 25, 26, 28, 29, 44, 45

[56] References Cited

U.S. PATENT DOCUMENTS

| | | | |
|---|---|---|---|
| 4,069,411 | 1/1978 | Morton | 382/22 |
| 4,115,805 | 9/1978 | Morton | 382/23 |
| 4,115,806 | 9/1978 | Morton | 382/23 |

Primary Examiner—Leo H. Boudreau
Assistant Examiner—Jose L. Couso
Attorney, Agent, or Firm—Darby & Darby

[57] ABSTRACT

A system for detecting an edge of an image includes a scanning circuit for scanning the image to produce a composite video signal including an image signal and a horizontal synchronizing signal, a converting circuit for converting the image signal, into a binary image signal, a detecting circuit for detecting a change in level of the binary image signal so as to produce a detecting signal, a timing signal generator for producing clock pulses, a first data-producing circuit responsive to the clock pulses and the horizontal synchronizing signal for producing X coordinate data with respect to each horizontal scanning line, a second data-producing circuit responsive to the horizontal synchronizing signal for producing a predetermined data, a memory, and a data write circuit responsive to the horizontal synchronizing signal and the detecting signal for loading the predetermined data and the X coordinate data sequentially onto the memory.

4 Claims, 5 Drawing Sheets

| Y data | X data |
|--------|--------|
| Y₁ | Xs1 |
| Y₁ | Xe1 |
| Y₁ | Xs2 |
| Y₁ | Xe2 |
| Y₂ | Xs3 |
| Y₂ | Xe3 |
| Y₂ | Xs4 |
| Y₂ | Xe4 |
| ⋮ | ⋮ |

| data |
|------|
| 0 |
| 0 |
| 0 |
| Xs1 |
| Xe1 |
| Xs2 |
| Xe2 |
| 0 |
| Xs3 |
| Xe3 |
| Xs4 |
| Xe4 |
| 0 |
| ⋮ |

SYSTEM FOR DETECTING EDGE OF IMAGE

This is a continuation of application Ser. No. 933,029, filed Nov. 20, 1986, now abandoned.

BACKGROUND OF THE INVENTION

1. Field of the Invention

This invention relates to a system for detecting an edge of an image of an object, for example, being transported on a belt conveyor, so as to determine the shape and posture of the object or to inspect such an object.

2. Related Art

In the field of image processings, generally, a high speed processing has been desired. For example, in the inspection of an object being transported on a belt conveyor, it is required that image processings should be carried out in a real-time fashion to produce necessary control signals. For example, for processing image data obtained by scanning images IM1 and IM2 shown in FIG. 1, X and Y coordinates of points P1, P2 . . . on the edge of each of the images where the image data, produced in accordance with the scanning, varies from one state to another, for example, from the 1 state (high level) from the 0 state (low level) and vice versa, must be detected (the points P1, P2 . . . are hereinafter referred to as "level-varying points"). FIG. 2 shows a block diagram of a diagram of a system for detecting such level-varying points. This image edge-detecting system will now be described. As shown in FIG. 3, a composite video signal VE is fed from a video camera 10 to a synchronizing separator circuit 12 which separates a vertical synchronizing signal VD and a horizontal synchronizing signal HD from the composite video signal VE and outputs these separated synchronizing signals along with an image signal Vs. The image signal Vs is converted by a converter circuit 14 into a binary image signal Vb representative of the image of the object to be inspected. The prior art image-edge detection system shown in FIG. 2 comprises a 2-bit shift register 16, an exclusive OR gate 18, an inverter 20, a NAND gate 22, three counters 24, 26 and 28, and a memory 30. The level-varying points on the edge of the binary image signal Vb are detected through the shift register 16 and the exclusive OR gate 18, and a write enable signal WE of the low level is fed from the NAND gate 22 to a write terminal $\overline{W}$ of the memory 30 in synchronizing with a trailing edge of a clock pulse SC, so that X coordinate data outputted from the counter 24 and representing the X coordinate of the level-varying point is loaded onto the memory 30. At the same time, Y coordinate data outputted from the counter 26 and representing the Y coordinate of the level-varying point is loaded onto the memory 30. The address of the memory 30 into which the X and Y coordinate data are to be written are designated by the output of the address counter 28. Then, when the write enable signal WE goes high, the contents of the address counter 28 are incremented. In this manner, each time the level of the binary image signal Vs is varied, the X and Y coordinate data are written into the memory 30 as shown in FIG. 4. In other words, the coordinates of the level-varying points on the edge of the image are sequentially stored in the memory 30. Therefore, when the image processing is carried out under the control of a computer 32, the position of the edge of the image is easily obtained merely by reading the X and Y coordinate data from the memory 30.

With this prior art image-edge detecting system, as described above, the X coordinate data (column position data) and Y coordinate data (row position data) of each level-varying point on the edge of the image are stored in the memory 30. Therefore, the Y coordinate data of the varying points on a common row or horizontal scanning line are equal in value. Thus, the Y coordinate data of the same value are stored in the memory 30, so that the capacity of the memory 12 must be correspondingly increased, and in addition the time required for data processing by the computer is prolonged.

SUMMARY OF THE INVENTION

It is therefore an object of this invention to provide a system for detecting an edge of an image by which the time required for data processing by a computer is shortened.

According to the present invention, there is provided a system for detecting an edge of an image comprising:

(a) means for scanning the image to produce a composite video signal including an image signal and a horizontal synchronizing signal;

(b) means for converting said image signal into a binary image signal;

(c) detecting means for detecting a change in level of said binary image signal so as to produce a detecting signal;

(d) a timing signal generator for producing clock pulses;

(e) a first data-producing means responsive to the clock pulses and said horizontal synchronizing signal for producing X coordinate data with respect to each horizontal scanning line;

(f) a second data-producing means responsive to said horizontal synchronizing signal for producing a predetermined data;

(g) memory means; and (h) data write means responsive to said horizontal synchronizing signal and said detecting signal for loading said predetermined data and said X coordinate data sequentially onto said memory means.

DESCRIPTION OF THE PREFERRED EMBODIMENT OF THE INVENTION

Figure 5:
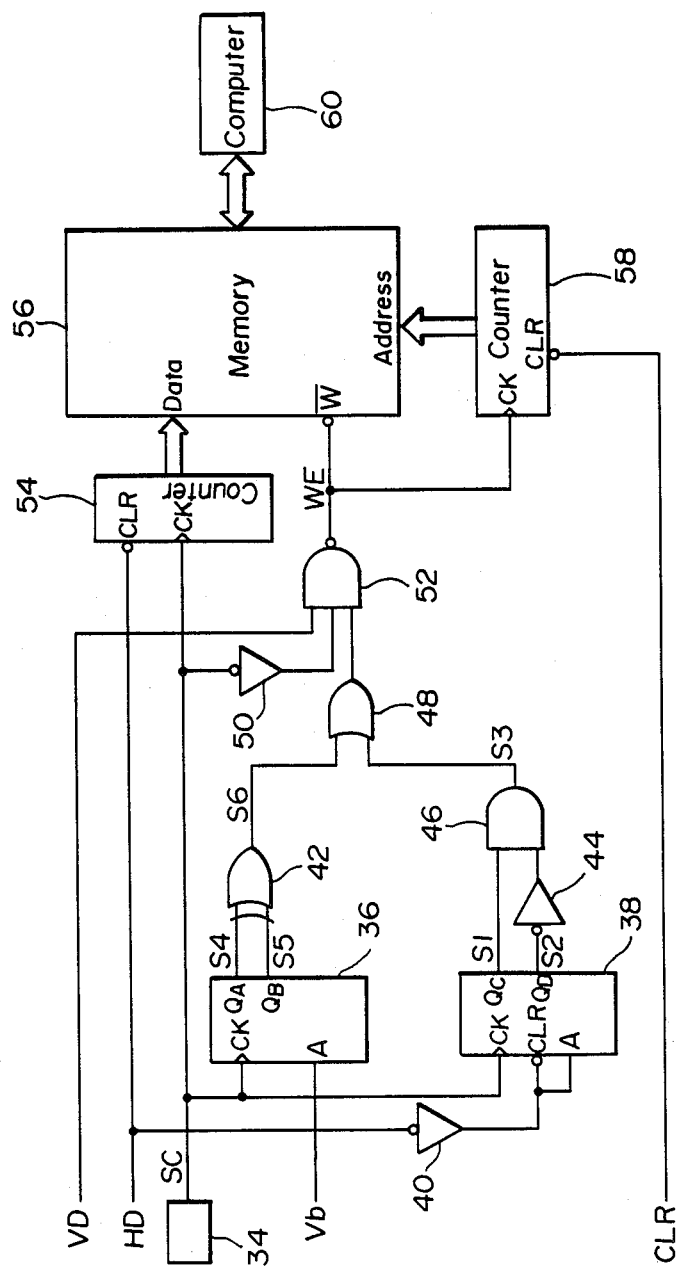
FIG. 5 is a block diagram of an image-edge detecting system provided in accordance with the present invention.

A system for detecting an edge of an image of an object will now be described with reference to FIG. 5. Clock pulses SC are generated from a timing signal generator 34. A binary image signal Vb, derived from a composite video signal as described above, is fed to a data input terminal A of a 2-bit shift register 36, and the binary image data Vb is loaded onto the shift register 36 and is outputted from a first output terminal QA of the shift register 36 when a clock pulse SC is applied to a clock terminal CK of the shift register 36. Then, when the next clock pulse SC is applied to the clock terminal CK of the shift register 36, the binary image signal Vb is shifted one bit and is outputted from a second output terminal QB of the shift register 36. Another 2-bit shift register 38 is of the same construction as the shift register 36. An inverter 40 inverts a horizontal synchronizing signal HD, separated from the above-mentioned composite video signal, and applies it to clear terminal CLR and data input terminal A of the shift register 38.

The image-edge detection system comprises an exclusive OR gate 42, an inverter 44, an AND gate 46, an OR gate 48, an inverter 50, and a NAND gate 52. A counter 54 counts up the clock pulses SC, and the contents of the counter 54 are cleared by the horizontal synchronizing signal HD. The output of the counter 54 is fed to a data input terminal of a memory 56. Reference numeral 58 designates an address counter of which contents are incremented each time a signal WE, outputted from the NAND gate 52, goes high. The contents of the address counter 58 is cleared by a clear signal CLR fed from an associated timing signal generator (not shown), this clear signal CLR being produced immediately before each scanning of the image by the video camera. The output of the address counter 58 is fed to an address terminal of the memory 56 to serve as address data. When the signal WE fed to a write terminal $\overline{W}$ of the memory 56 goes low, the output data of the counter 54 is written into that address or location of the memory 56 designated by the output of the address counter 58.

Figure 6:
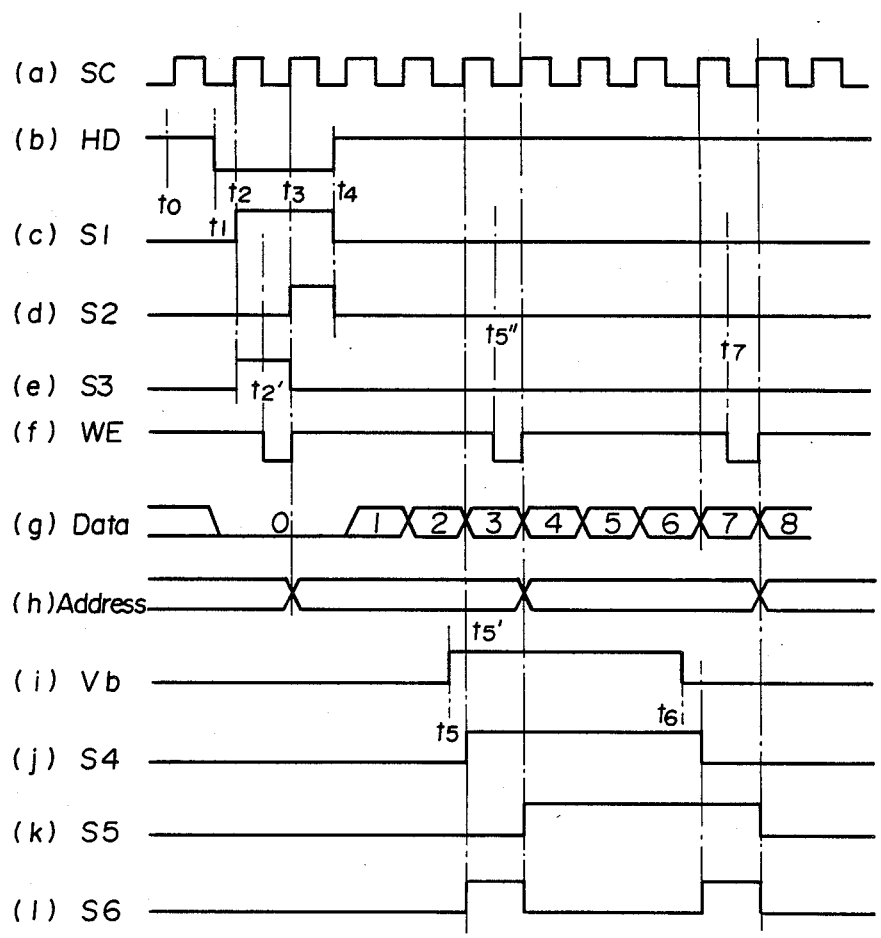
FIG. 6 is a timing chart of the various signals appearing in the detection system of FIG. 5.

The operation of the detecting system will now be described with reference to FIG. 6. First, at time t0, the horizontal synchronizing signal HD is at the high level, and therefore the output of the inverter 40 is at the low level, so that the shift register 38 has been cleared. Next, when the horizontal synchronizing signal HD goes low at time t1, the output of the inverter 40 goes high, so that the signal level at each of the clear terminal CLR and data input terminal A of the 2-bit shift register 38 goes high. Then, when a clock pulse SC is supplied at time t2, the output (High) of the inverter 40 is loaded onto the shift register 38, so that a signal S1 at an output terminal QC of the shift register 38 goes high (FIG. 6(c)). Then, when another clock pulse SC is supplied at time t3, a signal S2 at an output terminal QD of the shift register 38 goes high (FIG. 6(d)). Then, when the horizontal synchronizing signal HD goes high at time t4, the output of the inverter 40 goes low, so that the shift register 38 is cleared, thereby rendering the output signals S1 and S2 low (FIG. 6(c) and (d)).

Thus, when the horizontal synchronizing signal HD shown in FIG. 6(b) is supplied, the signals S1 and S2 are outputted from the output terminals QC and QD of the shift register 38, respectively, in the manner mentioned above. The signal S1 is fed to a first input terminal of the AND gate 46 while the signal S2 is inverted by the inverter 44 and is fed to a second input terminal of the AND gate 46. With this arrangement, the signals S1 and S2 fed respectively to the first and second input terminals of the AND gate 46 goes high at time t2, so that an output signal S3 of the AND gate 46 goes high (FIG. 6(e)), and this output signal S3 of the high level is fed to one input terminal of the NAND gate 52 via the OR gate 48. A clock pulse SC is adapted to be supplied to another input terminal of the NAND gate 52 via the inverter 50, and a vertical synchronizing signal VD, separated from the aforesaid composite video signal, is fed to a further input terminal of the NAND gate 52. The vertical synchronizing signal VD is maintained at a high level throughout the operation.

Therefore, at time t2', the write enable signal WE of the low level is fed from the output terminal of the NAND gate 52 to the write terminal $\overline{W}$ of the memory 56 and to a clock terminal CK of the address counter 58. At this time, that is to say, at time t2', the horizontal synchronizing signal HD is maintained at a low level, so that the counter 54 has been cleared. As a result, when the write enable signal WE of the low level is applied to the write terminal $\overline{W}$ of the memory 56, the contents "0" of the counter 54 is loaded onto that address of the memory 56 designated by the output of the address counter 58. Next, when a clock pulse SC is supplied at time t3, the contents of the address counter 58 is incremented. Thus, each time the horizontal synchronizing signal HD is supplied to the circuit shown in FIG. 5, X coordinate data representative of "0" is written into the above-mentioned address of the memory 56.

Then, for example, it is assumed that the binary image data signal Vb goes high at time t5 and goes low at time t6 (FIG. 6(i)). In this case, when a clock pulse SC is supplied at time t5', the image signal Vb of the high level is loaded onto the 2-bit shift register 36, so that a signal S4 at one output terminal QA of the shift register 36 goes high (FIG. 6(j)) while a signal S5 at the other output terminal QB remains low (FIG. 6(k)). Since these two signals S4 and S5 are fed to input terminals of the exclusive OR gate 42, an output signal S6 of the high level is outputted from the exclusive OR gate 42 at time t5'(FIG. 6(l)) and is fed to the NAND gate 52 via the OR gate 48. Then, the write enable signal WE of the low level is fed from the NAND gate 52 to the write terminal $\overline{W}$ of the memory 56 in synchronization with a trailing edge of the clock pulse SC at time t5", so that the contents "3" of the counter 54 is loaded onto that address of the memory 56 designated by the address data outputted from the address counter 58 (FIG. 6(g)). And, similarly, at time t7 when the write enable signal WE of the low level is subsequently outputted, the contents "7" of the counter 54 is written into another address of the memory 56 designated by the address data outputted from the address counter 58 (FIG. 6(g)). Each time the X coordinate data is written into its address of the memory 56, the contents of the address counter 58 is incremented.

Figure 1:
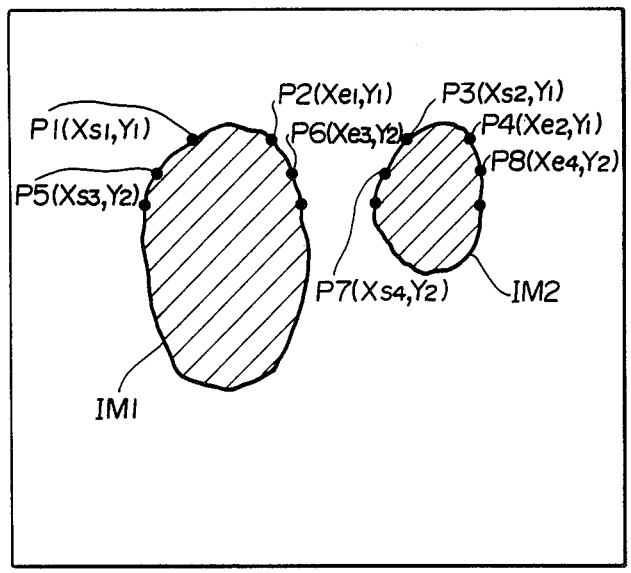
FIG. 1 is a diagrammatical illustration showing images to be inputted to an image-edge detecting system.
Figure 2:
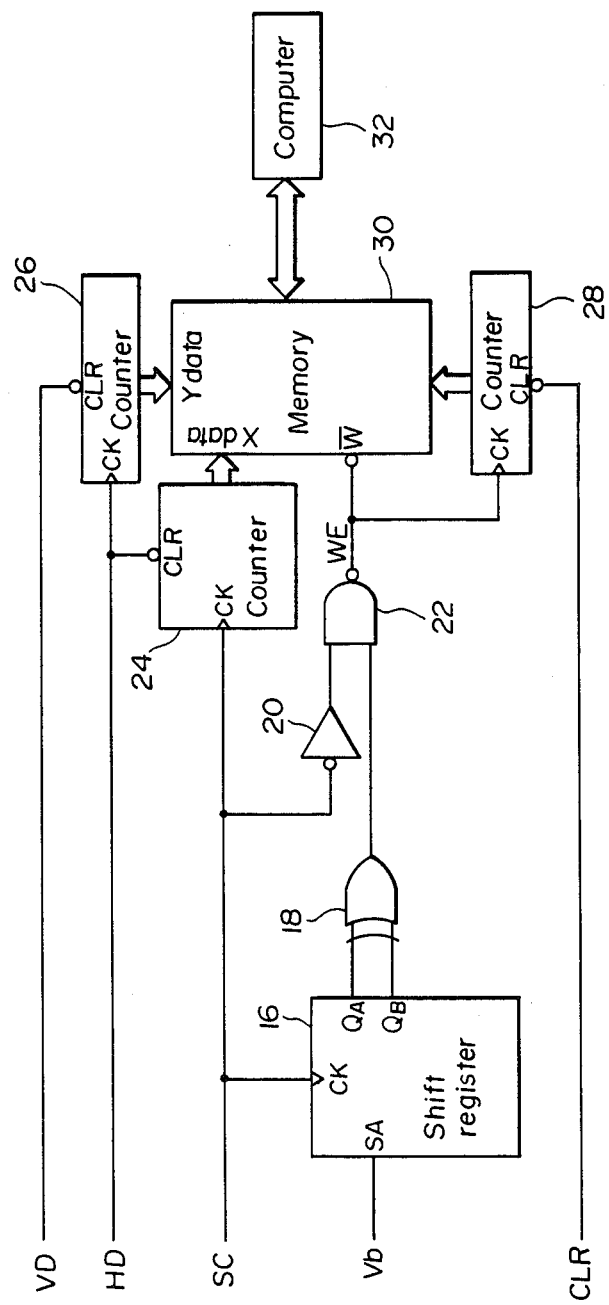
FIG. 2 is a block diagram of a prior art image-edge detecting system.
Figures 3, 4, 7:
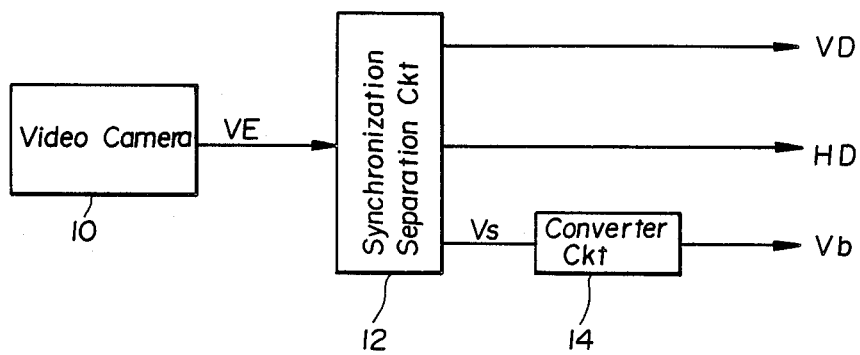
FIG. 3 is a block diagram of a circuitry for producing a binary image signal from a composite video signal.
FIG. 4 is an illustration showing a data table stored in a memory of the prior art detecting system of FIG. 2.
FIG. 7 is a data table stored in a memory of the detecting system of FIG. 5.

As described above, each time the level of the binary image signal Vb is varied, the X coordinate data outputted from the counter 54 is loaded onto the memory 56. For example, the X coordinate data, representative of the X coordinates of the level-varying points on the edges of the images shown in FIG. 1, are written into the respective addresses of the memory 56 in a manner shown in FIG. 7. Therefore, for carrying out the image processing, the position of the edge of the image is detected by reading the data from the memory 56 under the control of a computer 60. It will be appreciated that the Y coordinate of each level-varying point is detected by counting the number of zeros ("0"s) stored in the memory 56.

What is claimed is:

1. A system for detecting an edge of an image, said image comprising a plurality of horizontal scanning lines, said system comprising:
   (a) means for scanning the image, one horizontal scanning line at a time, to produce a composite video signal including an image signal and a horizontal synchronizing signal;

(b) means for converting said image signal into a binary image signal;

(c) detecting means for detecting a change in level of said binary image signal so as to produce a detecting signal;

(d) a timing signal generator for producing clock pulses;

(e) a first data-producing means responsive to the clock pulses and said horizontal synchronizing signal for producing X coordinate data with respect to each horizontal scanning line;

(f) a second data-producing means responsive to said horizontal synchronizing signal for producing a predetermined data representative of completion of scanning of each of said plurality of horizontal scanning lines;

(g) memory means; and (h) data write means responsive to said horizontal synchronizing signal and said detecting signal for loading said predetermined data and said X coordinate data sequentially onto said memory means for all of said plurality of horizontal scanning lines, said data write means not loading any data onto said memory means except in response to said horizontal synchronizing signal and said detecting signal.

2. A system according to claim 1, in which said data write means comprises a counter for counting signals corresponding to said horizontal synchronizing signal and said detecting signal to produce address data which is fed to said memory means, said signals corresponding to said horizontal synchronizing signal and said detecting signal also being supplied to said memory means as write enable signals for loading said predetermined data and said X coordinate data sequentially onto said memory means.

3. A system according to claim 1, in which said detecting means comprises a 2-stage shift register for loading said binary image signal in response to said clock pulse, and an exclusive OR gate for subjecting outputs of said shift register to an exclusive OR operation to output said detecting signal.

4. A system according to claim 1, in which said first and second data-producing means are constituted by a counter which counts said clock pulses to produce said X coordinate data and is cleared by said horizontal synchronizing signal.

* * * * *